Patented Feb. 8, 1927.

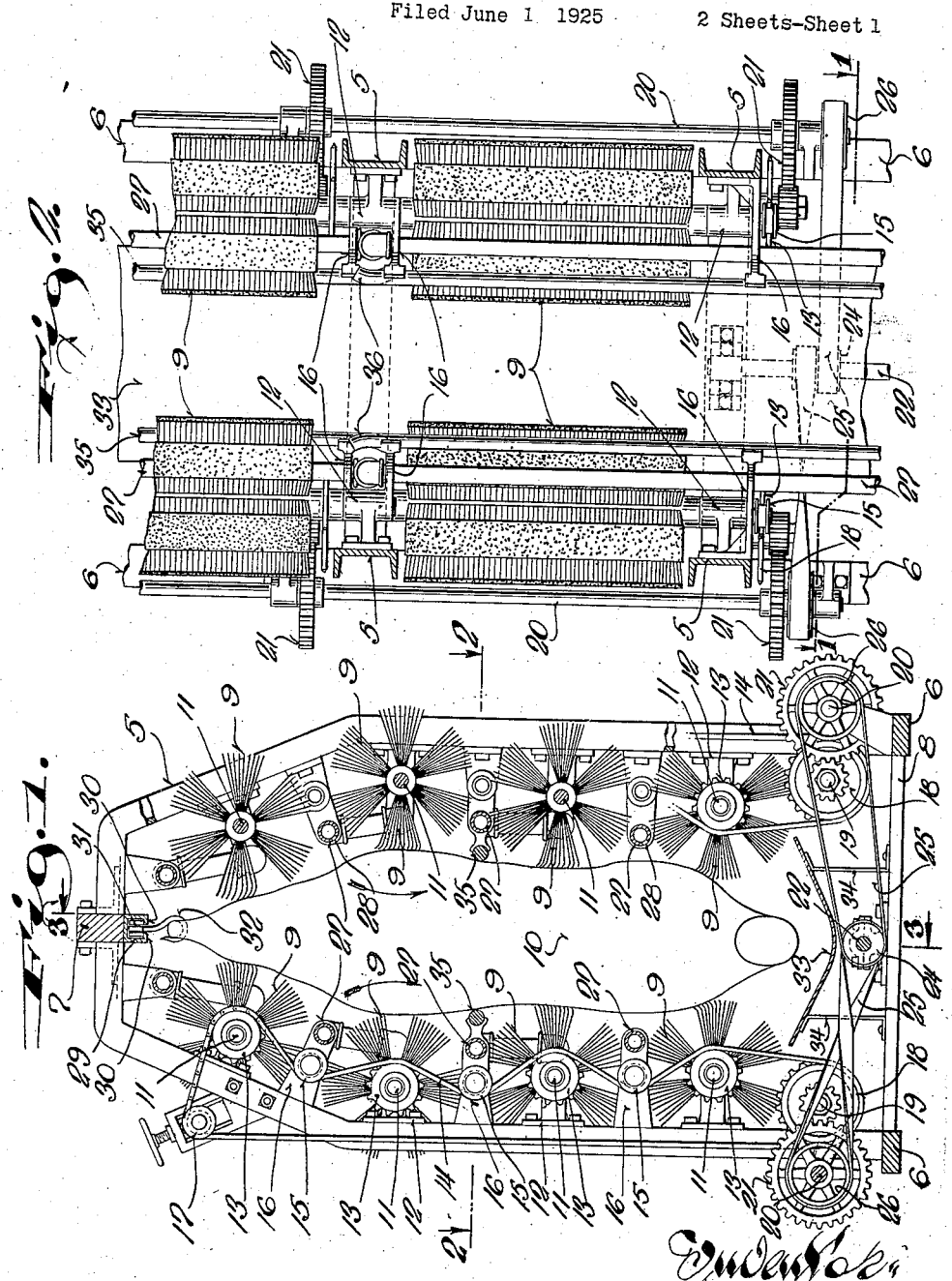

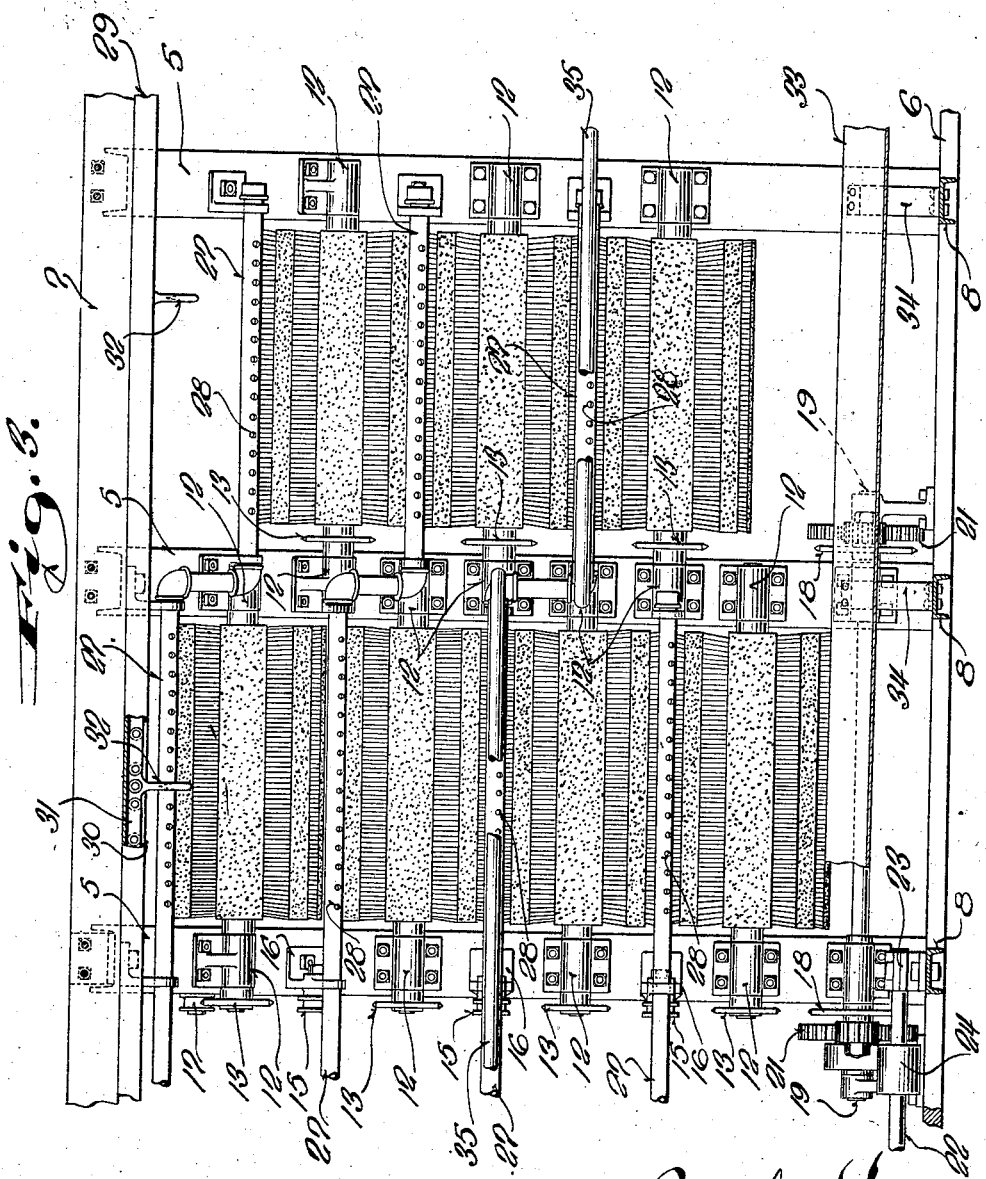

1,617,002

UNITED STATES PATENT OFFICE.

KARL ZERBE, OF MILWAUKEE, WISCONSIN.

CARCASS SCRUBBER.

Application filed June 1, 1925. Serial No. 34,055.

This invention relates to certain new and useful improvements in carcass scrubbers and contemplates as an object the provision of an improved machine whereby the cleaning of carcasses of animals, particularly halves of steers, beeves, or the like, is accomplished.

Heretofore this work has been done by hand, requiring the services of a number of workmen and also materially slowing up production, and this invention has as another object the provision of an improved machine of the character described which will more efficiently perform that, which heretofore has been done by hand.

The dressing and cleaning of carcasses requires the use of a cleansing fluid, and as a result it is very hard to keep the place where the carcasses are being handled, in a clean dry state and this invention has as a further object the provision of an improved machine which is so arranged as to carry off the cleansing fluid after it has dropped from the carcass to thus eliminate damp, unsanitary floors, heretofore prevalent.

With the above and other objects in view which will appear as the description proceeds, my invention resides in the novel construction, combination and arrangement of parts substantially as hereinafter described and more particularly defined by the appended claim, it being understood that such changes in the precise embodiment of the hereindisclosed invention may be made as come within the scope of the claim.

In the accompanying drawings, I have illustrated one complete example of the physical embodiment of my invention constructed according to the best mode I have so far devised for the practical application of the principles thereof, and in which:

Figure 1 is a view looking at one end of a machine embodying my invention, parts thereof being in end elevation and parts in section, said view being taken on the plane of the line 1—1 of Figure 2;

Figure 2 is a view taken horizontally through Figure 1 on the plane of the line 2—2, and Figure 3 is a transverse sectional view, partly in elevation and partly in section, taken vertically through Figure 1 on the plane of the line 3—3.

Referring now more particularly to the accompanying drawings, in which like numerals designate like parts throughout the several views, the numeral 5 designates upright stanchions or standards which are spaced apart and connected at their lower ends by longitudinal base members 6 and at their upper ends by a central longitudinal beam 7. The stanchion is of approximately U-shape and is formed of two channel members bent to the shape illustrated in Figure 1 with their upper ends directed inwardly and bolted to the beam 7 to form the closed part of the U and their lower ends suitably secured to the base members 6 which are held in proper spaced relation by transverse braces 8 connecting the same adjacent each standard.

The spaces on each side of the machine between the adjacent standards 5 have a series of rotating brushes 9 mounted therein, to form a tunnel or channel throughout the length of the machine, the walls of which are defined by the brushes so that when a carcass 10 is passed therethrough the sides thereof are subjected to the cleansing and scrubbing action of the brushes. The series of brushes in the first space are staggered with respect to those in the following space so that any portion of the carcass 10 which is missed by the brushes of one space will be engaged by those of the next space.

The brushes 9 are fixed to shafts 11 which are journaled in bearings 12 fixed to the standards. The bearings for the shafts of the series of brushes in one space are disposed medially of the bearings for the shafts of the brushes in the next space as shown in Figure 3, to produce the staggering of the brushes.

The adjacent ends of the shafts of each series of brushes have sprocket wheels 13 fixed thereto around which driving sprocket chains 14 are trained, the sprocket chains passing about idle guide pulleys 15 journaled from brackets 16 secured to the standards and also over an adjustable idling sprocket 17 for tightening. The sprocket chains and consequently the brushes are driven by sprocket wheels 18 fixed to stub shafts 19 adapted to be driven from auxiliary shafts 20 journaled along the base frames 6, the drive to the stub shafts 19 being effected by gear connections 21.

The auxiliary shafts 20 are driven in opposite directions from a main drive shaft 22 which is located centrally of the machine and has its inner end journaled in a bearing 23 and has a drive pulley 24 fixed thereto which is connected with the auxiliary shafts 20 by belts 25 trained about pulleys 26 fixed to the auxiliary shafts. The reversed direction of rotation of the auxiliary shafts is obtained by crossing one of the belts 25, as best shown in Figure 1.

The brushes 9 are rather stiff and the necessary cleansing fluid, such as water, or the like, is supplied thereto from spray pipes 27 supported from the standards 5 by the brackets 16 and having jets or spray openings 28 therein, arranged to eject their fluid onto the carcass 10 as it passes through the machine. The sprays of adjacent spaces between the standards are staggered like the brushes and are located between adjacent brushes as clearly illustrated.

The carcass is supported in its movement through the machine from a channel type track 29 supported from the beam 7 with its marginal edges directed inwardly, as at 30, to form the track on which a traveling chain or belt 31 is movably supported. At intervals the belt 31 has depending hooks or other supporting members 32 extended downwardly through the slot formed between the inturned ends, which are adapted to be engaged by the carcasses. The chain 31 is preferably operated by a motor or other means, not shown, and the carcass is thus automatically carried through the machine and requires the services of an operator only to engage and disengage it from the hook 32.

The direction of rotation of the brushes 9 is in accordance with the arrows illustrated in Figure 1 so that the liquid sprayed thereon is brushed downwardly to thus effect the better cleansing of the carcasses and prevent unnecessary spraying of the fluid about the room. The liquid and the dirt brushed off the carcasses is collected in a drip pan or trough 33 supported from the transverse members 8 by brackets 34 and extended longitudinally through the machine.

As the carcass is moved through the machine it is held against swaying by guide rails 35 supported from the inner ends of the brackets 16 and so arranged as to prevent the carcass being engaged by the brushes on one side and being free of the brushes on the other side. The rails 35 have their ends curved outwardly, as at 36, in order to insure the passage of the carcass therebetween.

From the foregoing description taken in connection with the accompanying drawings it will be readily apparent to those skilled in the art to which an invention of this character appertains that I provide an improved machine for automatically cleaning and scrubbing carcasses which will be efficient in operation and which will be durable in construction.

What I claim as my invention is:

A carcass scrubber of the class described, comprising a conveying means, spaced vertical standards having substantially inverted V-shaped upper portions, means supporting the conveying means from the apexes of the standards, means whereby carcasses are conveyed through the standards by the conveying means, a plurality of rotatable brushes, shafts mounted in said brushes and having their ends journaled in bearings mounted on the adjacent legs of the standards, sprockets carried by the shaft, a common drive means for the sprockets to revolve the brushes, a cooperating plurality of rotatable brushes positioned directly opposite the first mentioned brushes to form a passageway of brushes adapted to simultaneously engage both sides of the carcass, and horizontally disposed guide rails fixed to the legs of the vertical standards and positioned directly opposite each other for maintaining the carcass in a correct cleaning relation with the brushes.

In testimony whereof I affix my signature.

KARL ZERBE.